United States Patent [19]

Joubert

[11] 4,085,813
[45] Apr. 25, 1978

[54] THROTTLE CONTROL FOR ARTICULATED TRACTOR WITH MULTIPLE POWER PLANTS

[75] Inventor: Jerauld D. Joubert, Longmont, Colo.

[73] Assignee: Steiger Tractor Inc., Fargo, N. Dak.

[21] Appl. No.: 746,154

[22] Filed: Nov. 30, 1976

[51] Int. Cl.² ............................................. B62D 11/04
[52] U.S. Cl. ................................. 180/14 A; 180/6.48; 180/77 H; 180/135
[58] Field of Search .................. 180/135, 6.48, 14 A, 180/14 R, 51, 6.3, 6.32, 6.64, 77 H, 77 R; 74/471

[56] References Cited

U.S. PATENT DOCUMENTS

| | | | |
|---|---|---|---|
| 2,551,231 | 5/1951 | Anderson | 180/6.48 |
| 2,575,256 | 11/1951 | Bobard | 180/14 R X |
| 2,704,131 | 3/1955 | Vahs | 180/66 |
| 2,906,356 | 9/1959 | Richard | 180/6.48 |
| 3,024,858 | 3/1962 | Davis | 180/6.48 |
| 3,183,990 | 5/1965 | Edwards | 180/14 R |
| 3,362,493 | 1/1968 | Davis | 180/6.32 |
| 3,477,534 | 11/1969 | Ladwig | 180/14 R |
| 3,605,928 | 9/1971 | Loesch | 180/14 R |
| 3,776,325 | 12/1973 | Jespersen | 180/6.48 |
| 3,783,963 | 1/1974 | Erwin | 180/6.3 |

*Primary Examiner*—Joseph F. Peters, Jr.
*Assistant Examiner*—Terrance L. Siemens
*Attorney, Agent, or Firm*—Frederick E. Lange

[57] ABSTRACT

A throttle control system for a tractor having at least three tractor vehicles each of which has its own engine and wheels driven by the engine, in which there is means responsive to change in angular relationship of the vehicles to change the relative settings of the throttles of the vehicles in the rear so that the engine of the vehicle on the inside of the turn tends to operate at a slower speed than the engine of the vehicle on the outside of the turn. There are cables running from a throttle control in the operator's compartment of the lead vehicle to the throttles of all three vehicles, the angle responsive means being effective, when the throttles are in advanced position, to override the action of the main throttle lever and move one of the throttles towards throttle retard position without disturbing the position of the main throttle control.

8 Claims, 12 Drawing Figures

THROTTLE CONTROL FOR ARTICULATED TRACTOR WITH MULTIPLE POWER PLANTS

BACKGROUND OF THE INVENTION

To an increasing extent in recent years, tractors have become larger and larger. One tractor in common use today employs two sections articulated with respect to each other and an engine having over 250 drawbar horsepower. The reason for these very large tractors is that the farms on which they are used have greatly increased in size without any corresponding increase in the number of people doing the farming. It has accordingly become desirable to employ a very large tractor so that very wide implements can be pulled by it. This enables the ground to be covered in a shorter period of time by a single operator.

From a practical standpoint, there tends to be an upper limit on the size of the engine which may be used in a tractor. Consequently, as more and more power is necessary with ever larger tractors, some means must be developed for providing for a plurality of engines in connection with any one tractor.

One arrangement which has been proposed is that of having two engine driven units behind a lead tractor, each of said engine driven units having its own ground engaging member. These units may be rigidly secured together side by side or as in the co-pending application of Paul A. Nystuen for "Articulated Tractor With Multiple Power Plants" filed of even date herewith, the engine driven units may be in the form of two tractor vehicles coupled together to the lead vehicle through a linkage arrangement.

The problem that arises whenever two or more tractor units are connected side by side, each tractor unit driving its own set of wheels or other ground engaging members, is that upon a turn, the two sets of wheels or ground engaging members tend to be rotated at the same speed. As is well known, it is necessary in a turn for the wheels on the outer side of the turn to rotate at a higher speed than those on the inside of the turn. Where a single engine or power plant is employed for driving wheels on the inside and outside of the turn, a differential is normally employed to permit a difference in speed of the two sets of wheels. This, however, is not practical where the inner wheels are driven by a separate power plant than the outer wheels.

One way that has been proposed of overcoming this problem discussed above is that of providing some means to enable the engine driving the wheels on the inside of the turn to be operated at a lower speed than that driving the wheels on the outside of the turn. These prior art arrangements, however, have not been particularly suitable for use in connection with tractors in which there are at least three independent internal combustion engines, each associated with one of the vehicles forming the articulated tractor. Furthermore, these prior art arrangements have not been particularly satisfactory in connection with an arrangement in which the main control of all of the tractor vehicles is normally from a central point in the lead tractor.

SUMMARY OF THE PRESENT INVENTION

The present invention is concerned with a throttle arrangement for a tractor in which there are at least three tractor vehicles, each of which has its own engine driving wheels for that vehicle with means in the first vehicle for positioning the throttle positioners of the engines of all three vehicles and means responsive to change in angular relationship between the vehicles for affecting the relative positions of the throttle positioners of the second and third vehicles so that the engine of the vehicle on the inside of the turn tends to operate at a slower speed than the engine of the vehicle on the outside of the turn.

The first tractor vehicle is preferably provided with an operator's compartment in which there is an adjustable throttle control which is effective to position the throttle positioners of all three vehicles. The means responsive to the change in angular position of the vehicles temporarily changes the position of the throttle positioner of either the second or third vehicle, depending upon which vehicle is on the inside of the turn, without altering the position of the throttle control in the operator's compartment.

The throttles are preferably controlled through throttle cables, each of which has an inner cable and an outer housing. The throttle control in the operator's compartment positions the throttles through movement of the throttle cable within the housing. The means responsive to change in the angular relationship is effective to move the housing and hence the cable therein.

The means responsive to change in angular relationship is preferably biased to a neutral position in which the throttle positioners of the second and third tractor vehicles are in positions determined by the position of the throttle control. The means responsive to change in angular position of the vehicles operates against the bias to change temporarily the position of the throttle positioner of at least one of the vehicles. As soon as a turn has been completed, the throttle positioner returns to the position determined by the throttle control in the operator's compartment.

The means responsive to the change in angular relationship may comprise a pivoted member one element of which is secured to the coupling means between the first tractor vehicle and the second and third tractor vehicles and the other of which is secured to the first tractor vehicle so that as the first tractor vehicle changes in angular relationship with respect to the second and third tractor vehicles, the pivoted member is rocked about its pivot point. Upon such rocking taking place, the means is effective to alter the position of one or both of the throttle positioners of the second and third vehicles.

Preferably, the pivoted member referred to previously cooperates with two fixed stops carried by the first tractor vehicle and which can be adjustable so that a limited amount of turning of the vehicle can take place without any rocking of the pivoted member about its pivot point to effect the change in the positions of the throttle positioners of the second and third vehicles.

The throttle system of the present invention is particularly applicable to a type of tractor arrangement in which the second and third vehicles are not only pivoted about a vertical axis with respect to the first tractor vehicle but are also rockable about the longitudinal axes with respect to each other. In such an arrangement, it would be very difficult to have any kind of differential arrangement due to the relative movement of the vehicles with respect to each other.

Various other features and objects of the invention will be apparent from a consideration of the accompanying specification, claims and drawing.

DESCRIPTION OF THE PREFERRED EMBODIMENT

Figure 1:
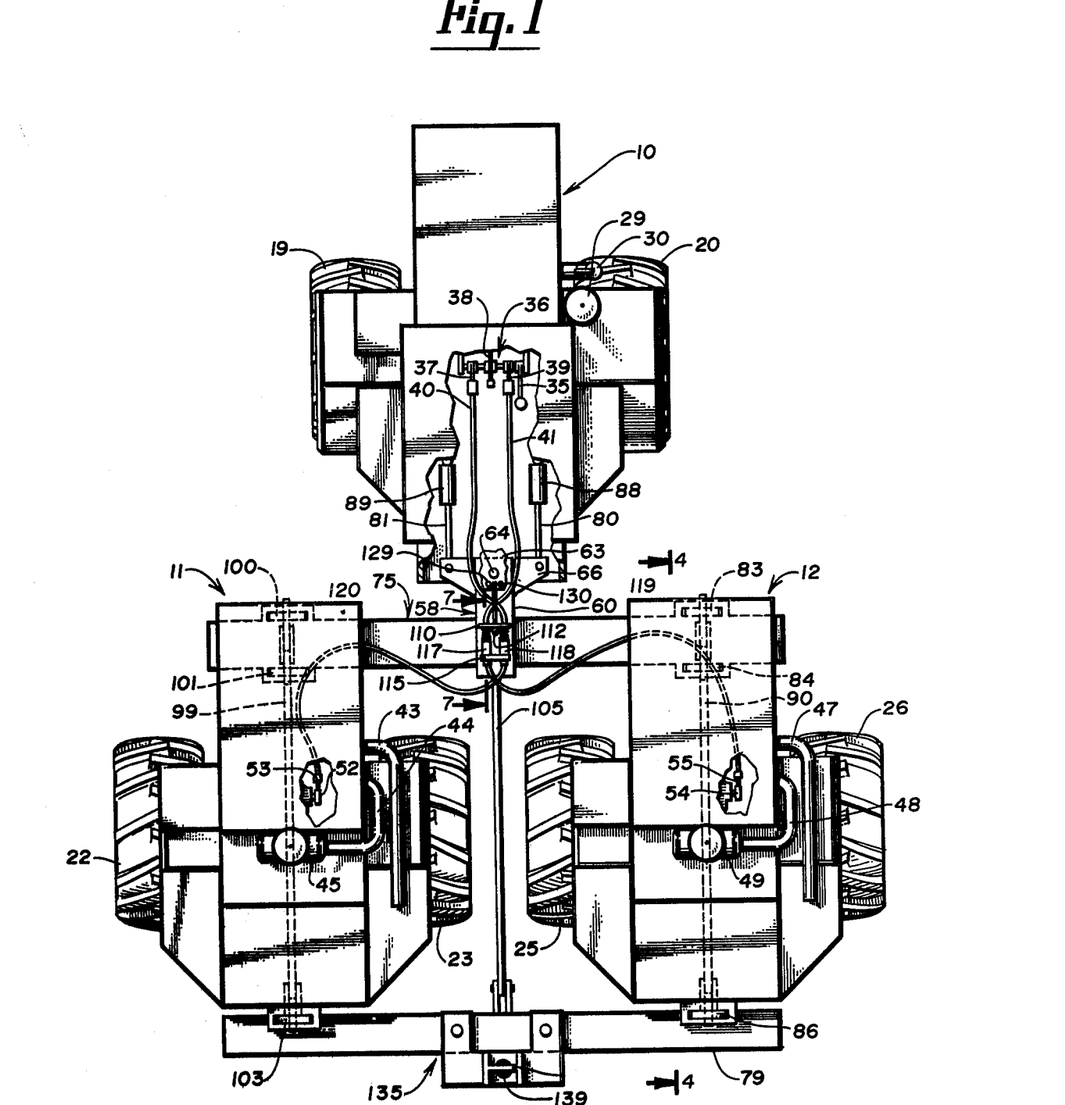
FIG. 1 is a plan view, with portions broken away of the improved tractor of the present invention.
Figure 2:
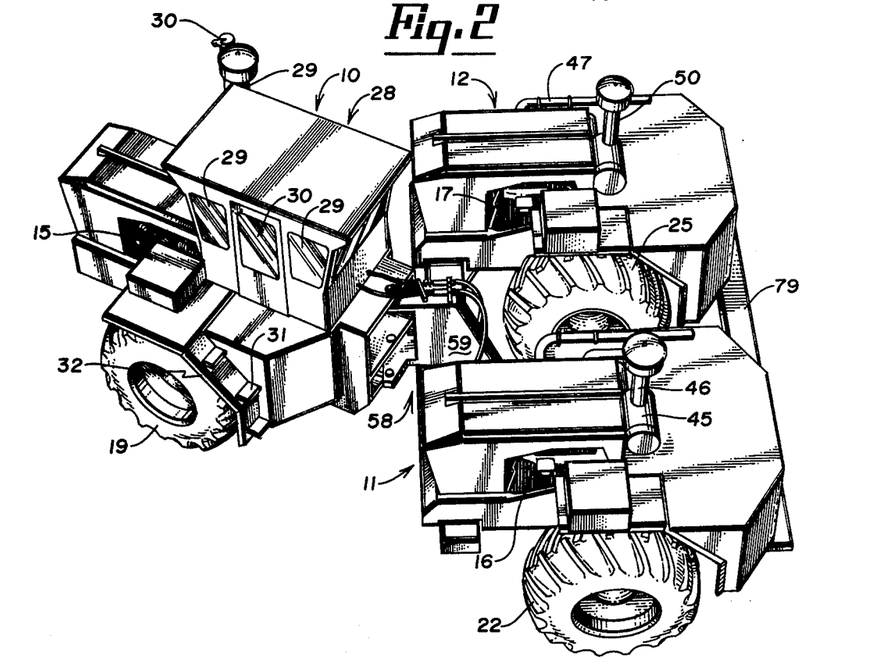
FIG. 2 is a perspective view of the improved tractor with the front tractor vehicle being turned with respect to the rear second and third tractor vehicles.

Referring to the drawing, the improved tractor and throttle control is shown as applied to an arrangement in which there is a first tractor vehicle generally indicated by the reference numeral 10 and second and third tractor vehicles indicated by the reference numerals 11 and 12. As will be explained, the invention is applicable to various types of articulated tractors but is shown in connection with an arrangement in which there are three tractor vehicles secured together so that each vehicle is capable of movement relative to the other vehicles. As best shown in FIG. 2, the forward vehicle 10 is provided with an engine 15 and the rear tractor vehicles 11 and 12 with engines 16 and 17, respectively. These engines are only partially shown in FIG. 2. The front vehicle 10 is provided with a pair of wheels 19 and 20 visible in FIG. 1. These wheels are driven by the engine 15 of the vehicle 10. Similarly, tractor vehicle 11 has a pair of wheels 22 and 23 driven by the engine 16. Similarly, vehicle 12 has a pair of wheels 25 and 26 driven by the engine 17.

It is to be understood that each pair of wheels in connection with each of the vehicles is mounted on a driven axle which is connected through suitable transmission and differential mechanisms with the engine in question. In each case, neither the axle nor the wheels are turnable about a vertical axis with respect to the vehicle and the steering is done through turning the relative positions of the vehicles in a manner to be subsequently described.

The front vehicle 10 is the vehicle in which the operator's controls are located. This vehicle may be very similar to the front portion of the vehicle shown in the Irwin U.S. Pat. No. 3,933,216. As with the tractor in that patent, the front vehicle 10 is provided with an operator's cab 28. This cab may have a plurality of windows 29 and an access door 30. Access to the door 30 may be had by steps 31 located on the fender 32 as better shown in the aforesaid Irwin patent. Located adjacent to the front corner of the operator's compartment 28 is an air intake pipe 29 and an exhaust stack 30. The air intake 29 is connected to an air cleaner and from there to the intake manifold of the engine. The exhaust pipe 30 leads from the exhaust manifold of the engine 15. It will be understood that the driver's compartment 28 is provided with a driver's seat and with various controls. The throttle control of the present invention is shown in more detail in FIGS. 3 and 6 through 12. In FIG. 1, the throttle control is shown in somewhat schematic form as comprising a lever 35 which through a suitable mechanism 36 is designed to actuate throttle cables 37, 38 and 39. Throttle cable 38 goes to the throttle of the engine 15 in tractor 10. As will be explained in more detail, the throttle cables 37 and 39 which extend through suitable cable housings 40 and 41, are employed to control the throttles of the engines of tractors 11 and 12.

The engine 16 of tractor vehicle 11 is equipped with exhaust pipe 43 leading from the exhaust maifold and an intake pipe 44 leading from an air cleaner 45 to which an air intake pipe 46 is connected. Similarly, engine 17 is provided with an exhaust pipe 47, an air intake pipe 48, an air cleaner 49 and an air intake stack 50. The engine 16 of vehicle 11 is also supplied with a throttle control lever 52 to which the inner end of cable 53 is connected. Likewise, the engine of tractor vehicle 12 is provided with a throttle control lever 54 to which is connected throttle control cable 55. The operation of throttle control cables 53 and 55 will be described later.

Figure 3:
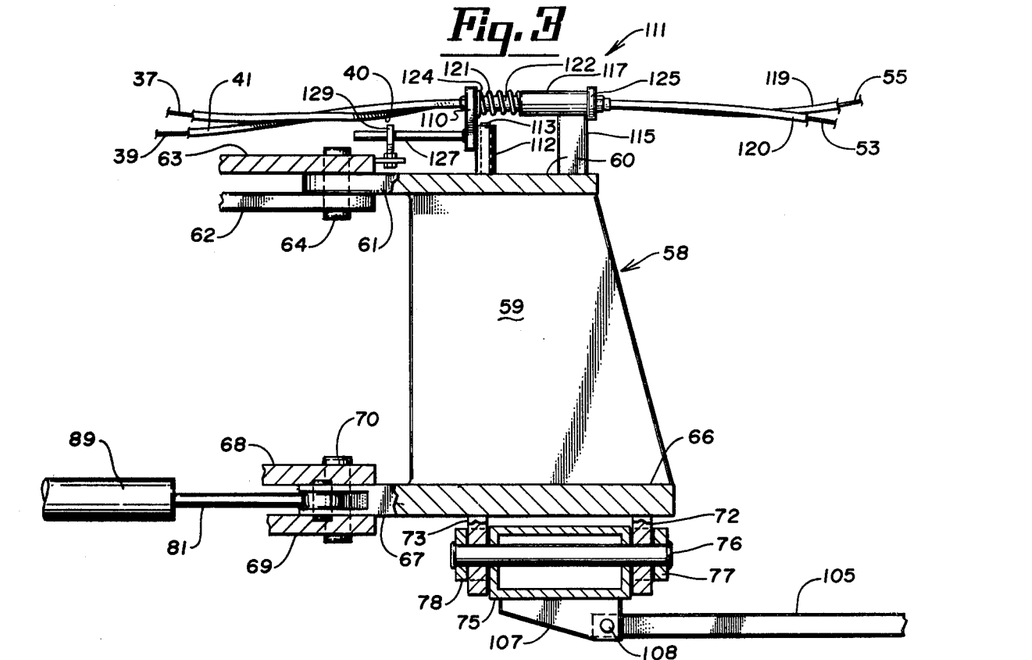
FIG. 3 is a view partly in section showing the center yoke construction between the front tractor vehicle and the second and third vehicles.

Referring now to the manner in which the various tractor vehicle units are interconnected, lead tractor vehicle 10 is provided with a center yoke 58. This center yoke comprises two spaced vertical side walls 59 generally trapezoidal in shape which are connected at their upper ends by a top wall 60, as best shown in FIG. 3. The top wall 60 has a forwardly extending portion 61 which is disposed between two plates 62 and 63 integrally joined with the frame of the lead tractor vehicle 10. Forwardly extending portion 61 of top wall 60 is pivotally secured to the plates 62 and 63 by a pivot pin 64. The lower ends of the two spaced side walls 59 are joined by a bottom wall 66 having a forwardly extending portion 67 disposed between two plates 68 and 69 which likewise are integral with or rigidly joined to the lead tractor. A pivot pin 70 is effective to join the forwardly projecting portion 67 of the bottom wall 66 with the two spaced plates 68 and 69. It will be noted that pins 64 and 70 are aligned so that the center yoke 58 will pivot about a vertical axis defined by the pins 64 and 70.

The lower wall 66 has a triangular forward portion as best shown in FIG. 1. Pivotally connected to the outer forward extremities of this triangular portion of wall 66 are two rods 80 and 81 which in turn are connected to the pistons of hydraulic motors 88 and 89. It will be obvious that if fluid is admitted to the inner end of the cylinder of hydraulic piston 88, for example, and fluid is allowed to leave the same end of the hydraulic cylinder operator 89, the center yoke 58 will pivot in a clockwise direction about the pivot pins 64 and 70. As will be more clear from the subsequent description, this is used for steering the tractor. The operation of hydraulic motors 88 and 89 is under the control of the steering wheel in the operator's cab. When it is desired to turn to the left, for example, fluid is admitted to the inner side of cylinder 88 and allowed to leave the inner side of cylinder 89, as just explained. This tends to force the center yoke 58 in a clockwise direction. This tends to cause the vehicle 10 to move in a counterclockwise direction with respect to the center yoke 58.

Referring now to FIG. 3, it will be noted that two ears 72 and 73 extend downwardly from lower plate 66 of the center yoke 58. A hollow beam 75 is pivotally connected to the center yoke 58 by a pivot pin 76 which extends through the beam and the ears 72 and 73. Washers 77 and 78 may be interposed between the outer side of the ears 72 and 73 and the outer head of the pin 76 which may be secured against actual movement in any given manner such as by being peened over against the washer 77 or washer 78 or may have both a head and nut associated therewith.

The beam 75, as best shown in FIG. 1, functions as a cross bar which serves as a portion of the means for interconnecting the lead tractor vehicle 10 to the rear tractor vehicles 11 and 12. There is also a second cross bar 79 which extends between the rear ends of the tractor vehicles 11 and 12 and serves to couple the rear tractor vehicles 11 and 12 together at their rear.

Figures 4, 5:
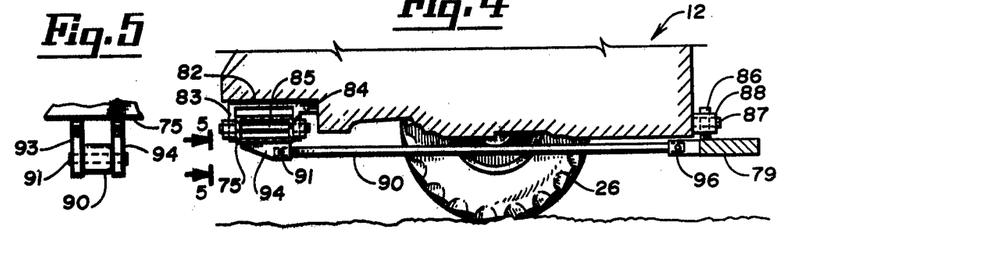
FIG. 4 is a sectional view taken along the line 4—4 of FIG. 1.
FIG. 5 is an end view of a portion of FIG. 4 as viewed in the direction of the arrow 5—5 of FIG. 4.

The manner in which the cross bar 75 is secured to the tractor vehicles 11 and 12 is best shown in FIG. 4. Referring to that figure which shows the manner in which cross bars 75 and 79 are secured to the tractor 12, it will be noted that there is a bracket 82 secured to the under side of the frame of tractor vehicle 12 and having downwardly extending arms 83 and 84. The cross beam 75 is located between arms 83 and 84 and secured thereto by a pivot pin 85. In this way, the cross bar 75 is coupled to the tractor 12 in such a way as to permit rocking movement of the tractor with respect to cross bar 75 about the longitudinal axis of the tractor. The cross bar 79 is secured to the rear of tractor 12 by means of an upstanding flange 86 which is pivotally secured at 87 by a bracket 88 secured to the rear of the tractor. Again, the pivotal connection between the rear cross bar 79 and the tractor 12 is such that the tractor 12 can rotate about its longitudinal axis with respect to bar 79. A pull rod 90 extends between the cross beams 75 and 79. As best shown in FIG. 5, the cross beam 85 has two downwardly extending ears 93 and 94. The forward end of the pull rod 90 extends between ears 93 and 94 and is secured thereto by a pivot pin 91. The rear end of the pull rod 90 is similarly connected to the rear cross bar 79 by a pivotal connection 96. These pivotal connections 91 and 96 are capable of exerting a pulling force.

It is to be understood that tractor 11 is connected in the same manner to the cross bars 75 and 79 as has just been described in connection with tractor 12. Thus, the tractor 11 has on its under side a bracket including downwardly extending flanges 100 and 101 which are shown in dotted lines in FIG. 1. The cross beam 75 is journaled between flanges 100 and 101. Similarly, the rear beam 79 is pivotally connected at 103 to the rear tractor 11. Again, the pivotal connection is such that the tractor vehicle 11 can rock with respect to cross bar 79 about the longitudinal axis of the tractor vehicle. Similarly, there is a pull rod 99 extending between the front cross beam 75 and the rear cross beam 79. This pull rod is fastened to the cross beams 75 and 79 in a manner which is similar to that which has been described in connection with pull rod 90.

There is also a third pull rod 105 which is connected to the beam 75 adjacent the point where it is pivotally secured to the center yoke 58, as shown in FIG. 4. It will be noted that the beam 75 has a pair of downwardly depending flanges 107 and that the pull rod 105 is pivotally secured to these flanges by a pivot pin 108.

It will be seen from the above that the cross bars 75 and 79 are connected together by three pull rods 90, 99 and 105. It will readily be apparent that when the tractor vehicles 10, 11 and 12 are moving in a forward direction, the tractor vehicle 10 will exert a pull on the cross beam 75 through the center yoke 58. At the same time, the two tractors 11 and 12 will be pushing this beam 75 and will be pulling cross beam 79. The rear cross beam 79 is in effect being pulled by the front cross beam 75 as well as by tractor vehicles 11 and 12. The rear cross beam 79 is the one to which the implements and any other devices to be drawn by the tractor are attached and I have shown an implement hitch 135 secured thereto. This hitch may have means for receiving a tow pin 139. When it is desired to turn, the hydraulic cylinders 74 and 75 are actuated in the manner decribed above by the operation of the steering wheel or other steering device in the operator's cab, with the result that the center yoke 58 is rotated with respect to the longitudinal axis of tractor 10. This causes, as the vehicle moves, a change in the angular position of the cross bar 75 with respect to the tractor 10. Since the tractor vehicles 11 and 12 are attached to the cross bar 75, they likewise change their angular position with respect to the longitudinal axis of the vehicle 10. In this way, even though the axles to which the wheels of the various tractor vehicles are attached are not rotatable about a vertical axis and even though the wheels cannot turn with respect to the axles, the tractor is still caused to turn. The tractor will continue turning until the steering wheel or other steering control is rotated back to a neutral position to allow the center yoke 58 to resume the position with respect to tractor vehicle 10 shown in FIG. 1.

Turning now to the throttle control arrangement which forms the subject matter of my invention, throttle levers 52 and 54 of the engines of the rear vehicles are controlled in two different manners. In the first place, it is desired that when the control lever 35 in the operator's compartment is moved, the throttles of all three engines be moved simultaneously. Normally, these vehicles are all operated at full throttle. Regardless of whether they are or not, however, it is desirable that if each of the engines is to contribute substantially the same force, the throttles of the three tractors should be set at substantially the same position. It is also desirable, however, when the tractors are turning that the engine of the rear tractor vehicle that is on the inside of the turn be operated at a somewhat lower speed than is the engine of the rear tractor on the outside of the turn. As was explained previously, whenever a vehicle employing laterally spaced wheels is turned, it is necessary in order to avoid skidding of the tires to have the wheel on the outside of the turn rotate at a higher speed than the wheel on the inside of the turn. In the ordinary vehicle employing a single driving mechanism, this is taken care of by a differential which allows for a difference in the speed of the wheels on the inside and outside of the turn. Where, however, as in the present case, separate engines are employed to drive the wheels on the inside of the turn and the outside of the turn, it becomes very difficult to use a differential. The arrangement of the present invention is one in which the tractor on the inside of the turn is operated at a lower speed than the tractor vehicle on the outside of the turn.

Figure 7:
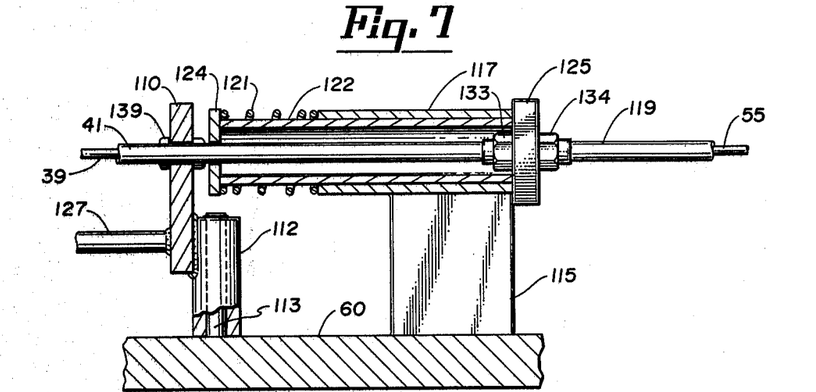
FIG. 7 is a sectional view of a portion of the differential throttle control mechanism, the section being taken along the line 7—7 of FIG. 1, but on a larger scale.
Figure 8:
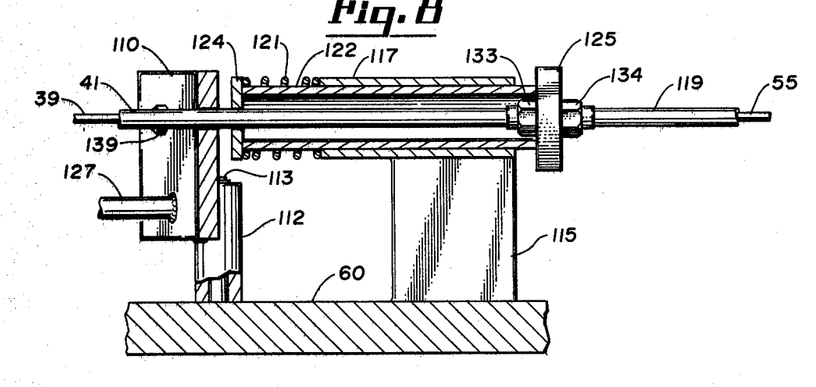
FIG. 8 is a sectional view similar to that shown in FIG. 7 but with the parts in the relative positions which they assume during a turn.
Figure 9:
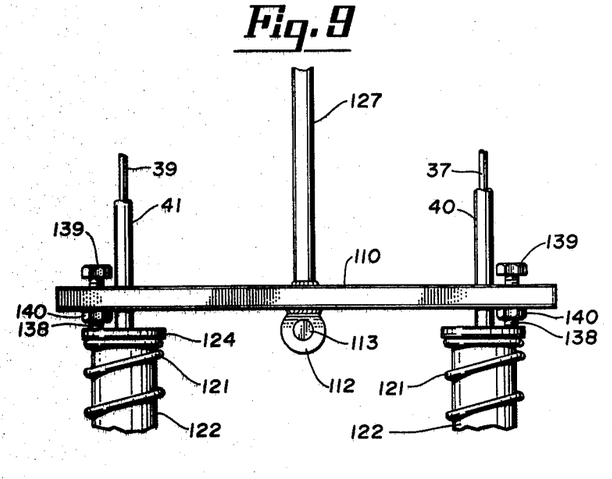
FIG. 9 is a detail of the differential throttle control mechanism showing the manner in which the cross bar of the mechanism is associated with other elements of the throttle control mechanism.

Referring specifically to the mechanism employed, both cables 37 and 39 which, as previously pointed out, are located in cable housings 40 and 41, extend through the cross bar 110 of a cable actuator 111 (FIGS. 3, 7 and 8). The cross bar 110 is pivotally mounted upon the upper plate 60 by being secured to a sleeve 112 journaled on a pivot 113 fastened to the plate 60. Thus, as best shown in FIG. 9, the cross bar 110 is rotatable about the pivot pin supporting the sleeve 112. Bracket 115, secured rigidly to the upper plate 60 supports two sleeves 117 and 118. Extending through these sleeves are the two cables 37 and 39 attached to the throttle lever 35. These cables along with the cable housings 40 and 41 extend through cylindrical plungers 122 which are slidable in the sleeves 117 and 118. The relationship of plungers 122 to the sleeves 117 and 118 is best shown in connection with sleeve 117 in FIGS. 7 and 8 which show these elements in section. Secured to the left hand end of plunger 122 (as viewed in FIGS. 7 and 8) are collars 124. A spring 121 is interposed between the inner end of sleeve 117 and collar 124 and serves to bias the plunger 122 to the left into engagement with the cross bar 110. Actually, as shown in FIG. 9, collar 124 of plunger 122 does not directly abut the cross bar 110 but rather engages abutment screws 138 which are threaded through the cross bar and are adjustably secured thereto. It will be noted that each screw 138 has a head 139. The screw is in threaded engagement with the cross bar 110 so that it can be adjusted as to the extent to which it projects beyond the cross bar 110 towards the collar 124. Lock nuts 140 are provided to hold the screws 138 in adjusted position. In practice, the screws 138 are adjusted so that with the plunger 122 in the position shown in FIG. 7, the collar 124 engages each of the screws 138 with only limited compression of the springs 121.

The movement of each plunger 122 to the left is limited by the engagement of a collar 125 secured to the right hand end of plunger 122. As shown in FIG. 7 in connection with sleeve 117, this collar is normally in engagement with the outer or rear end of the sleeve 117. The inner ends of the cable housings 40 and 41 are secured to the collars 125 by clamping means including nuts 133 (only one of which is shown in FIGS. 7 and 8). It is understood that there is one of these nuts 133 associated with each of the sleeves 122. The cable housings 119 and 120 associated with cables 53 and 55 attached to the throttle levers 52 and 54 are likewise secured to the collars 125 by means including clamping nuts 134. Again, there is a clamping nut 134 for each of the sleeves 122. It will thus be readily apparent that the cable housing 41 is secured to cable housing 119 and that similarly cable housing 40 is secured to cable housing 120. Connections are also made between the internal cables 39 and 55 and cables 37 and 53, respectively, so that any motion imparted to either cable 37 or 39 by operation of the throttle lever 35 is in turn imparted to the corresponding cable 53 or 55.

It will be noticed that cable housings 40 and 41 are crossed prior to entering the sleeves 117 and 118. Similarly, cable housings 119 and 120 are crossed again before the cables therein are connected to the throttle levers 52 and 54. The reason for this is that, as will be presently explained, it is necessary effectively to cross the cables between the sleeves 117 and 118 and the throttle levers 52 and 54 to get the desired action on turns. In order that the throttle levers to which cables 37 and 39 are connected occupy the same relative position with respect to throttle 35 as do the throttle levers 52 and 54 of the two rear engines, it is desirable to cross the cable housings 40 and 41 again so that left hand cable 37 connects with the left hand cable 53 and the right hand cable 39 connects with the right hand cable 55.

The cables 37, 39, 53 and 55 are capable of not only exerting a pull on the throttle levers 52 and 54 but also are capable of exerting a push. Thus, when throttle lever 35 is moved forwardly, the cables 53 and 55 are moved forwardly to move the throttle levers 52 and 54 to a throttle advance position. When throttle lever 35 is moved backwardly, the cables 37 and 39 and the cables 53 and 55 connected thereto are moved rearwardly to move the throttle levers 52 and 54 to a more retarded position. The operation of the cables will be discussed in more detail later in connection with FIGS. 7 through 12.

Figure 6:
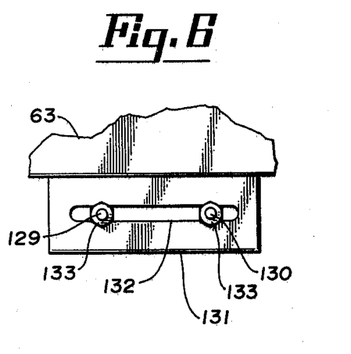
FIG. 6 is a view of a detail showing the method of adjustably mounting pins forming part of the apparatus for changing the relative throttle positions upon turning.

Referring back to the operation of the cross bar 110, this cross bar, as is evident from FIGS. 3 and 9, has a rod 127 rigidly secured thereto. This rod extends forwardly from the cross bar 110 and extends between two spaced pins 129 and 130. While these pins are shown as rigidly secured to plate 63 in FIG. 1, they are actually secured to an auxiliary plate 131, rigidly secured to the rear of plate 63 as by welding, for example. The plate 131 has a slot 132 therein and, as best seen in FIGS. 3 and 6, the pins 129 and 130 are in the form of bolts slidable in the slot 132. Each of these bolts has a head disposed beneath the plate 131 and a nut 133 secured to the bolt above the plate 131. The nuts 133 act as locking nuts to lock the pins 129 and 130 in any longitudinally adjusted position. It is thus possible to vary the spacing between the pins 129 and 130 so as to increase the amount of lost motion that is possible before the rod 127 engages either pin 129 or 130.

It will be appreciated that since the pins 129 and 130 are effectively secured to the front tractor vehicle 10 and the cross bar 130 is journalled upon the coupling member 58, any turning of the vehicle through actuation of the hydraulic cylinders 88 and 89 will cause the angular position of rod 127 to change with respect to the vehicle 10. If this change is sufficient, rod 127 will be effective to rotate the cross bar 110 about the pivot pin 113.

Figure 10:
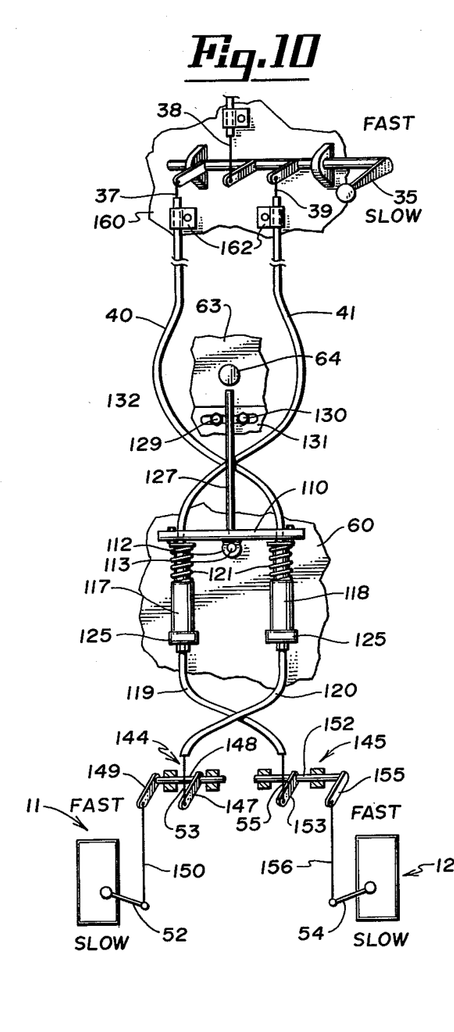
FIG. 10 is a partially schematic view showing the positions of the throttle levers of the rear engines when the main throttle control lever is in its "Slow" position.

The control of the throttles will now be described in connection with FIGS. 10, 11 and 12 which schematically show the throttle control system. While FIG. 1 shows, for purposes of simplicity, the cable housings 119 and 120 as going directly back to the throttle levers 55 and 53, respectively, use has been made in an actual embodiment of intermediate jack shafts 114 and 145. This reduces the length of the cables 119 and 120 and through the use of such intermediate shafts improves the operation of the cables. Referring to cable 120, it will be noted that the cable 53 is connected to a lever 147 secured to a shaft 148 journalled in suitable bearings. The shaft 148 also has a crank arm 149 secured thereto. This crank arm 149 is, in turn, connected to the throttle lever 52 through a link 150. Similarly, the jack shaft 145 has a shaft 152 journalled in suitable bearings and having a crank arm 153 to which the cable 55 of the cable assembly 119 is connected. The shaft 152 has a further crank arm 155 which is connected to the throttle lever 54 through a suitable link 156.

Cable housings 40 and 41 are clamped to a support 160 for the throttle lever 35 by clamps 162. Thus, no movement of cable housings 40 and 41 is possible with respect to the support for the throttle lever 35 which support is fixed with respect to the first tractor vehicle 10. Thus, any movement imparted by the throttle lever 35 to the inner cable members 37 and 39 will result in these cables sliding with respect to the housings 40 and 41. As previously pointed out, these cables 37 and 39 are directly connected to cables 53 and 55 so that any movement of these cables also results in movement of cables 53 and 55 to cause corresponding movement of the shafts 148 and 152 which, in turn, are operatively conneced to the throttle levers 52 and 54 of the engines of the second and third tractor vehicles. Thus, referring to FIG. 10, when the throttle lever 35 is moved to the "Slow" position shown in FIG. 10, cables 37 and 39 are pushed to the rear to rock the arms 147 and 153 toward the rear to in turn rotate shafts 148 and 152 in such a manner as to rotate crank arms 149 and 150 to the rear to move throttle levers 52 and 53 towards their "Slow" position.

Figure 11:
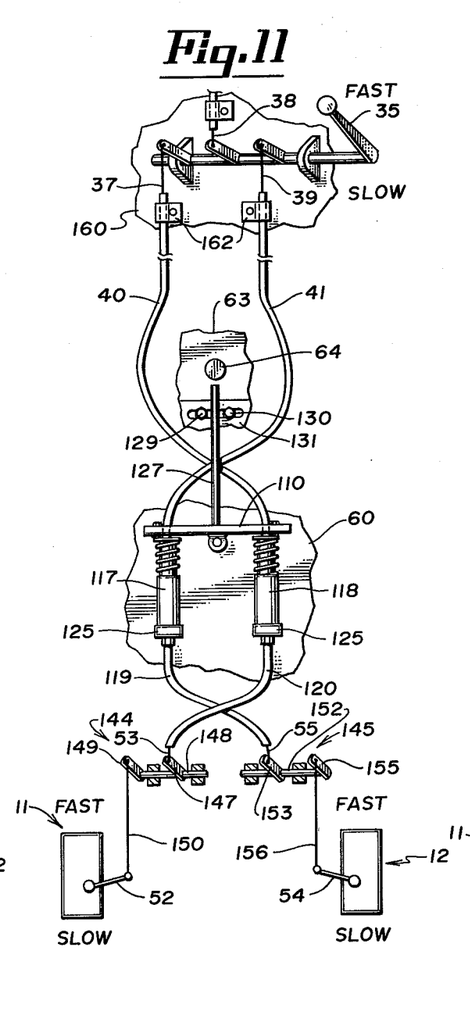
FIG. 11 is a view similar to FIG. 10 but showing the throttle levers of the rear engines in the positions they assume when the main throttle lever is in its "Fast" position.

In FIG. 11, the throttle lever 35 has been shown as moved to the "Fast" position. In this case, the cables 37 and 39 are pulled forwardly to in turn pull forwardly the cables 53 and 55 which are attached to the crank rms 147 and 153. Thus, the crank arms 149 and 155 are moved forwardly to move the throttle levers 52 and 54 to their "Fast" positions.

The operation which has been described to date is no different than if cable assemblies 40 and 41 were run directly from the throttle control lever 35 to the jack shafts 144 and 145 or even directly to the throttle levers 52 and 54. The operation upon a turn will, however, now be described and it is in this operation that the operation of my improved throttle control mechanism is very different from that of the prior art. In FIG. 12, the front vehicle is being shown as turned to the right with respect to the two rear vehicles 11 and 12. The result of this is that the rod 127 is engaged by the pin 130 and the cross bar 110 is rocked in a counter clockwise direction. This causes the spring 121 of cylinder 117 to be compressed and the plunger 122 within that cylinder to be moved to the rear as shown in FIGS. 8 and 12. As previously explained, the cable housings 41 and 119 are rigidly attached to the collar 125 associated with sleeve 117. Similarly, the cables 40 and 120 are rigidly attached to the collar 125 associated with sleeve 118. Thus, upon movement of the collar 125 associated with sleeve 117 to the rear, the cable housings 41 and 119 are forced to the rear. Inasmuch as the position of the inner cable 39 is fixed by the position of throttle lever 35 and inasmuch as the forward end of cable housing 41 is secured by the clamp 162 to the plate 160 supporting the throttle lever, the relative positions of the cable 39 and the cable housing 41 are fixed relative to each other so that any movement of the cable housing 41 causes a corresponding movement of the cable 39. Similarly, any movement of the cable housing 41 transmitted to the cable housing 119 causes a movement of both the cable housing 119 and the cable 55 therein which, as previously explained, is connected to the cable 39. This movement of the cable and cable housing is made possible by reason of the fact that there is a certain amount of slack present in cables 40, 41, 119 and 120. In any event, the movement of the plunger 122 within the sleeve 117 and the resultant movement of collar 125 and cable 119 in a rearwardly direction causes the inner cable 55 to move the lever 153 of the jack shaft 145 to the rear to move throttle lever 54 towards the "Slow" position. The extent of this movement will depend upon the degree of the turn resulting in movement of rod 127 and hence rocking of the cross bar 110. As previously pointed out, the pins 129 and 130 are adjustably spaced. If the turn is very slight so that the rod 127 is not forced against either pin 129 or 130, no movement of the cross bar 110 will take place. The importance of this is that in ordinary operation of the tractor, small deviations of the angular position will take place and it is not desired to have the throttle positions affected as a result of such small changes in angular position.

Referring back now to the effect of moving the throttle lever 54 towards "Slow" position, it will be noted that the effect of this is to reduce the speed of the engine of the vehicle 12. It will also be noted from FIG. 12 that this engine would be on the inside of the turn. Thus, its speed is reduced.

While the lever 110 is rocked in a counter clockwise direction and hence rocked away from the sleeve 118, this normally has very little effect upon the throttle 52 since in normal operation both throttles 52 and 54 are in their full "Fast" position. In other words, it is customary with large tractors of the type with which the present throttle control mechanism is concerned, to operate these tractors at full speed. Consequently, it is not possible to operate the engine 11 at any faster speed. Nevertheless, by reducing the speed of the inboard engine 12, the relative speed of the two engines is varied in such a manner as to cause the inboard engine to operate at a much slower speed than the engine on the outside of the turn.

It will be appreciated, of course, that if it were desired to advance the speed of the forward engine 11 at the same time as that of the inboard engine is retarded, it would be possible to adjust the stop screws 138 associated with cross bar 110 so that the levers 125 associated with both sleeves 117 and 118 were displaced slightly from the ends of the sleeves 117 and 118 when the system was being operated normally. In such case, the rocking of the cross bar 110 would actually increase the speed of the engine 11 as well as reducing the speed of engine 12, if the engine 11 were not already ooperating at full speed.

Figure 12:
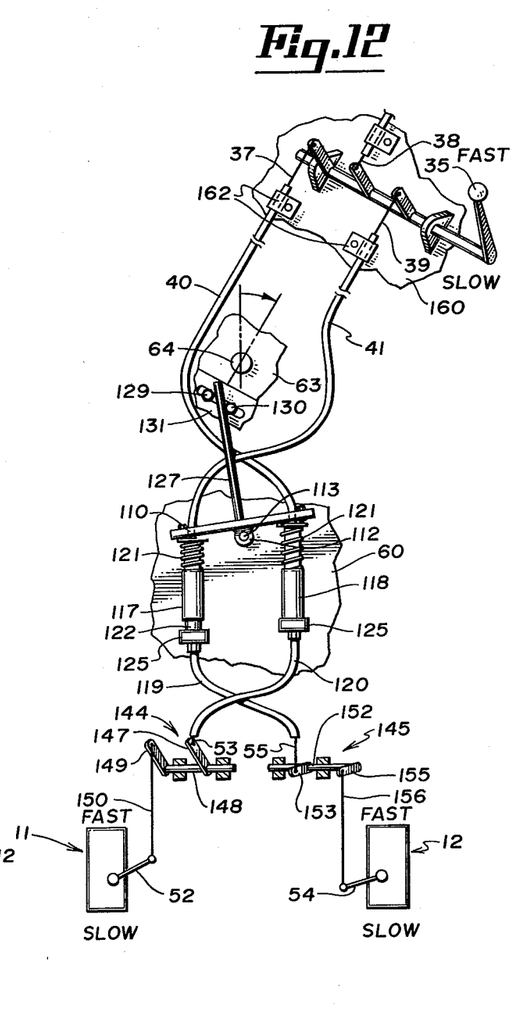
FIG. 12 is a view similar to FIGS. 10 and 11 but showing the throttles of the rear engines in the positions they assume when the tractor is turning.

It will of course be appreciated that upon a turn to the left the operation will be exactly reversed to that shown in FIG. 12 and exactly reversed to that described. Under these conditions, the rod 127 will be rocked to the right to rock the cross bar 110 in a clockwise direction to compress the spring 121 associated with sleeve 118 and allow the spring 121 associated sleeve 117 to expand. Under these conditions, it will be the collar 125 associated with sleeve 118 which is moved away from the end of the sleeve to cause the throttle lever 152 to be retarded. In this case, the engine 11 will be the inboard engine and it will be this engine whose speed it will be desired to reduce.

CONCLUSION

It will be seen that I have provided a throttle control mechanism for an articulated tractor having a plurality of power plants each driving their own wheels in which upon a turn, the engine associated with the tractor on the inside of the turn will be automatically slowed down. Thus, in this manner, any tendency for the wheels to skid upon a turn is minimized.

The arrangement I have provided, moreover, is capable of being used on a wide variety of articulated tractors, even though the component tractor vehicles may rotate about their longitudinal axes with respect to each other, since the arrangement of the present invention is highly flexible. While I have shown only three tractors, two of which are side by side and in the rear of a first tractor vehicle, it is to be understood that the invention is not so limited and that a larger number of tractor vehicles could be employed in various configurations.

In general, while I have shown a specific form for purposes of illustration, it is to be understood that the scope of the invention is limited solely by that of the appended claims.

I claim:

1. A throttle control system for an articulated tractor comprising first, second and third tractor vehicles, each having a rotatable axle, a pair of ground engaging driving elements coupled to said axle adjacent opposite ends thereof, and an engine drivingly connected to said axle to drive said driving elements, said first tractor vehicle also having an operator's compartment, each of said engines having a throttle positioner for adjustably positioning the throttle of the engine for varying the power output thereof, coupling means for pivotally securing said second and third tractor vehicles to the rear of said first tractor vehicle for pivotal movement with respect to said first vehicle about a generally vertical axis, a throttle control in the operator's compartment of said first tractor vehicle, means operatively connecting said throttle control to the throttle positioners of each of said vehicles for simultaneous adjustment of each of said throttle positioners in the same power changing direction upon movement of said throttle control, steering means including a steering control in the operator's compartment of said first tractor vehicle for changing the angular relationship of said second and third tractor vehicles with respect to said first tractor vehicle to temporarily cause an angular relationship to exist between the longitudinal axes of said second and third vehicles and the longitudinal axis of said first tractor vehicle, and means responsive to such change in angular relationship to affect the relative positions of the throttle positioners of said second and third vehicles so that the engine of the vehicle on the inside of the turn tends to operate at a lower speed than the engine of the vehicle on the outside of the turn.

2. The throttle control system of claim 1 in which the means operatively connecting said throttle control to the throttle positioners of said second and third tractor vehicles includes a plurality of cable assemblies, each including an inner cable and a housing therefor, said inner cables being effectively secured to said throttle control and to the throttle positioners for said second and third vehicles, and said means responsive to such change in angular relationship being connected to the housings of said cable assemblies for selectively altering the position of one of such housings and the cable secured therein to cause the throttle positioner secured thereto to be moved independently of said throttle control.

3. The throttle control system of claim 1 in which the means responsive to change in angular relationship between said first tractor vehicle and said second and third tractor vehicles comprises a member pivotally mounted on said coupling means and engageable with stop means secured to said first tractor vehicles.

4. The throttle control system of claim 3 in which the stop means comprises two spaced stop members disposed on opposite sides of said pivotally mounted member and selectively engaged by said members upon a predetermined change in such angular relationship.

5. The throttle control system of claim 4 in which the spacing of said stop members is adjustable so as to vary the predetermined change in such angular relationship that can take place before said means responsive to the change in angular relationship is effective to affect the relative positions of said throttle positioners.

6. The throttle control system of claim 1 in which the second and third tractor vehicles are secured together so as to be relatively movable about their longitudinal axes with respect to each other.

7. The throttle control system of claim 1 in which means responsive to the change in angular relationship of the vehicles affects the relative positions of the throttle positioners of the second and third vehicles without altering the position of the throttle control so that as soon as the normal angular relationship of the vehicles is restored, the throttle positioners of the second and third vehicles are returned to the positions called for by the throttle controls.

8. The throttle control system of claim 1 in which the means responsive to change in the angular relationship of the vehicles comprises a member biased to a position in which the positions of the throttle positioners of the second and third vehicles are determined solely by the position of the throttle control, said member being moved against its bias upon a predetermined change in such angular relationship to move in throttle retarding direction the throttle positioner of the vehicle on the inside of the turn.

* * * * *